July 1, 1969    F. A. RAVREBY    3,452,798

WHEEL ASSEMBLY AND FABRICATION THEREOF

Filed Jan. 18, 1967

INVENTOR
FRED A. RAVREBY

BY J. William Miller
ATTORNEY

United States Patent Office 3,452,798
Patented July 1, 1969

3,452,798
WHEEL ASSEMBLY AND FABRICATION THEREOF
Fred A. Ravreby, 173 Oak Crest Drive,
Framingham, Mass. 01701
Filed Jan. 18, 1967, Ser. No. 610,103
Int. Cl. B60c 7/24
U.S. Cl. 152—323          3 Claims

ABSTRACT OF THE DISCLOSURE

A wheel assembly, having a relatively rigid rim structure provided with a V-shaped outwardly extending flange around the periphery thereof. A unitary cast tire, formed of a material which is flexible at elevated temperatures, is provided with a recess on the inner periphery thereof. The tire is assembled on the rim by heating the tire to elevate the temperature thereof. The relative dimensions of the rim and tire are such that the tire tightly engages the rim with the recess and flange in mating relationship at ambient temperatures.

BACKGROUND OF THE INVENTION

This invention relates generally to wheel assemblies and more particularly to a new and improved rim structure having a unitary, cast, solid tire assembled thereon in a manner which provides a more stable assembly than heretofore available in the prior art.

Prior art wheel assemblies of the type to which this invention pertains have, generally, comprised a rim structure having a spoke or disc supported trough shaped rim with a tire formed of an elongated member having a wire reinforcing member coaxially disposed therein around the rim with the ends thereof connected to form a solid annular tire.

A primary problem, in prior art structures, lies in the difficulty of economically and quickly assembling the wheel structure in such a manner that the tire is firmly attached and straight on the rim so that the assembly is dependable and the treads thereof do not give a twisted appearance. Also, the elongated member forming the prior art tire must be either mounted on the rim and subsequently connected to form the annulus, or the form of the rim and tire must be such that the tire may be forced onto the rim. The prior art structure therefore involves either a difficult, costly step of assembly or results in a tire-rim fit which obviates a centered, straight arrangement and/or a tire which is easily displaceable from the rim.

SUMMARY

This invention provides a composite wheel structure comprising a unitary, annular solid tire having an aligning slot around the inner periphery thereof and a rim structure having an outwardly extending, slot-mating flange around the outer periphery thereof. The invention also provides a method for assembling a composite wheel structure in a quick and inexpensive manner by heat fitting of the tire on the rim structure.

It is therefore an object of this invention to provide a method for assembling a low-cost, composite wheel structure comprising a solid annular tire and rim by shrink-fitting the tire over the rim.

It is another object of this invention to furnish a low-cost wheel assembly comprising a solid tire and a unitary rim assembly which may be securely assembled at a minimum cost by heat-fitting.

It is still another object of this invention to furnish a solid, unitary tire assembled with a mating flange and groove structure to a rim structure to provide a secure, aligned assembly and to furnish a material for the tire which may be worked at elevated temperature to be assembled over the flange.

It is yet a further object of this invention to provide a unitary annular tire which may be sufficiently flanged at elevated temperature for secure assembly thereof with a supporting rim structure by furnishing a material which may be worked at elevated temperature.

These and other objects of the invention will become more apparent to those skilled in the art by reference to the following detailed description when viewed in light of the accompanying drawing wherein like numerals indicate like parts throughout the figures thereof and wherein:

DESCRIPTION OF THE PREFERRED EMBODIMENT

Figure 1:
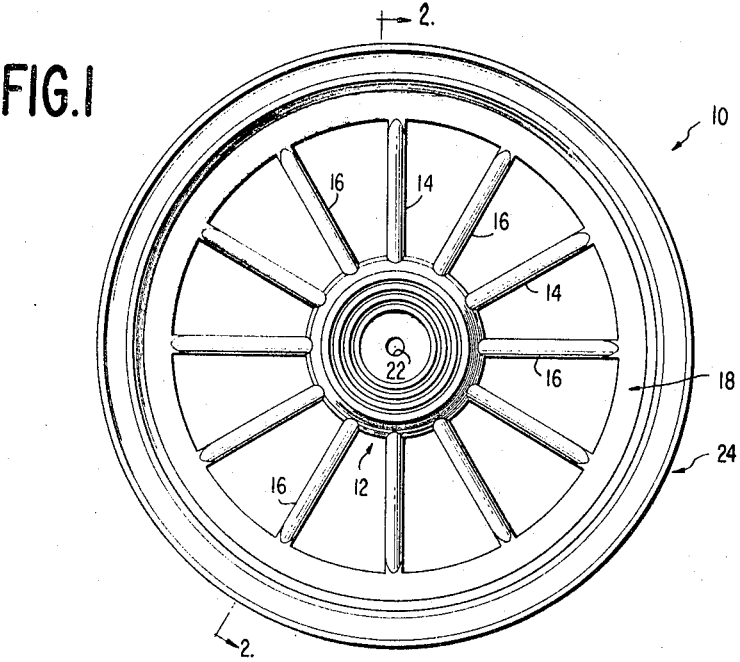
FIGURE 1 is an elevational view of a wheel assembly in accordance with the invention.
Figure 2:
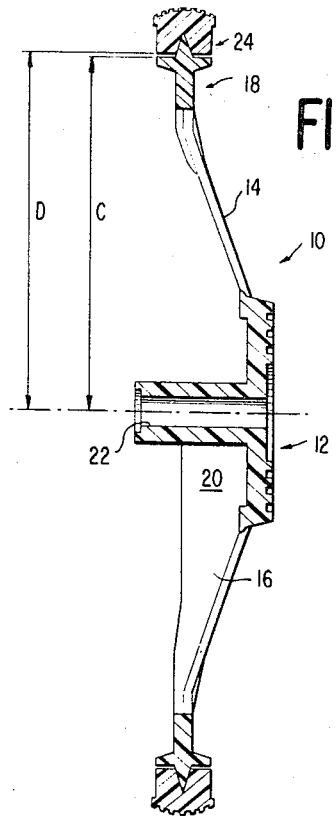
FIGURE 2 is an enlarged sectional view of the wheel assembly of FIGURE 1 taken along the lines 2—2 thereof.

Referring now to FIGURES 1 and 2 of the drawings, a wheel assembly, shown generally at 10 comprises a rim structure having a hub, generally indicated at 12, having radially extending spokes 14 and alternately disposed spokes 16 extending therefrom with a rim, shown generally at 18, fixed to the outer ends thereof. It should be noted that a portion of the background structure which would be normally seen in FIGURE 2 has been omitted for purposes of clarity.

Although the rim structure as thus far described, may be fabricated from individual components composed of any suitable material, it is preferred that, for economy and ease of fabrication, the rim structure be molded as an integral assembly by means such, for example, as the injection molding of a relatively rigid plastic material. For this reason, the configuration of the rim structure illustrated is specifically adapted to be injection molded. The configuration also provides maximum strength and rigidity with a minimum amount of material. The spokes 14, for example, are relatively thin and are intended, primarily, for decorative purposes while the alternate spokes 16 are reinforced with planar webs 20 which function to provide the major structural support between the hub 12 and the rim 18.

The hub 12 is provided with a suitable axle receiving bore 22 therethrough through which the wheel assembly 10 is subsequently rotatably mounted to an axle of structure for which the wheel is intended. The wheel assembly 10 further comprises an annular unitary tire 24 mounted around the periphery of the rim 18.

Figure 3:
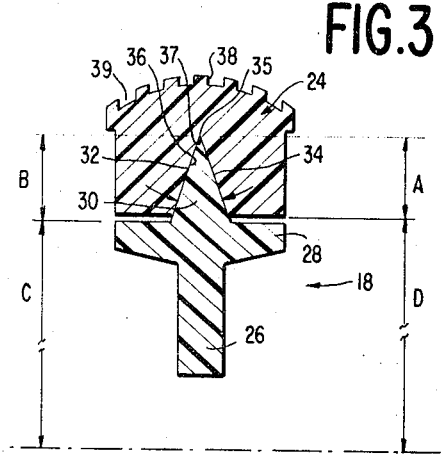
FIGURE 3 is a further enlarged sectional view of a portion of the wheel assembly shown in FIGURE 2.

Referring now more specifically to FIG. 3 of the drawing, the rim 18 comprises an inwardly extending flange 26 which supports a transverse flange or felly 28. An outwardly extending flange 30 is disposed around the outer periphery of the felly 28 and is preferably, in cross-sectional form, of an isosceles triangle with sloping surfaces 32 and 34 extending from the outer face of the felly 28 to an apex 35 at the top of the flange. The tire 24 is provided with a V-shaped groove 36 terminating at an apex 37 centrally disposed on the inner periphery thereof, and preferably configured to conform generally to the outer surfaces 32 and 34 of the flange 30. The depth of the flange 30, as represented by dimension B, is sufficiently greater than the depth of the groove 36, as represented by dimension A, so that the inner periphery of the tire 24 is spaced from the outer periphery of the felly 28 in the assembled condition shown. As an example, a flange having dimension B equal to 0.200 inch with a groove dimension A equal to 0.188 inch would satisfy the requirements of this invention. The radius of the outer periphery of the felly 28 is denoted by dimension C while the radius of the inner periphery of the tire 24 is denoted by dimension D. The rim 18 and tire 24 are so configured that the sum of the dimensions B and C, at normal ambient temperature, is greater than the sum of the dimensions of A and D so that, when the tire 24 is at ambient condition, the radius to the apex 37 of the groove 36 is smaller than the radius to the apex 35 of the flange 30. As an example, for a flange having the dimension $B+C$ equal to 2.90 inches, a tire having dimension $A+D$ equal to 2.55 inches would satisfy the requirements of this invention.

The tire 24 also has, formed thereon, a plurality of raised treads 38 which extend parallel to the side walls thereof forming a plurality of parallel grooves 39 therebetween. The tire is formed of a plastic which is resilient relative to the plastic used in the hub and rim. Polymers of vinyl chloride such as polyvinyl chloride and copolymers of vinyl chloride and vinyl acetate are particularly suited for this purpose. As a preferred embodiment, a polyvinyl chloride is used, comprising: resin, filler, lubricant, plasticizer and stabilizer which normally is relatively stiff (90+durometer) but which is elastic when warm (i.e., between 175° F. and 250° F. and preferably on the order of 200° F.). Due to the relatively massive cross-section of the tire, a high percentage of shrink occurs when the tire is cooled to ambient temperatures. The tire, because of the construction thereof and the relatively flexible nature of the material when warm, is molded as a unitary structure as, for example, by injection molding and thereby provides a relatively cheap and simply formed element to further reduce the cost of the total assembled structure.

Figure 4:
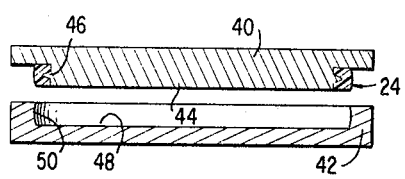
FIGURE 4 is a reduced sectional view of the tire portion of a wheel assembly in accordance with the invention and the molds for formation thereof.

Referring now to FIGURE 4 of the drawings, molds suitable for forming a tire in accordance with this invention comprise a male mold 40 and a female mold 42. The molds 40 and 42 are shown in a partly opened condition. The male mold has a disc portion 44 with a flange 46 extending from the periphery thereof. The female mold 42 is provided with a recess 48 having a generally cylindrical wall portion 50 therearound.

In molding, the die halves are installed in a die injection molding machine which operates in a manner well known in the art. The molds are closed so that the adjacent transverse faces thereof are in abutting relationship and ready for the molding operation. The tire material is then injected into the mold cavity formed between the male and female molds, and, after a suitable dwell, the mold halves are opened. Due to the properties of the material used in the formation of the tire 24, the resultant structure remains sufficiently flexible, at the temperature existing after molding, to be stripped from the mold halves regardless of the absence of "draft" in the mold. The tire 24 is, therefore, immediately stripped after opening the mold, and is then in condition for subsequent assembly on the rim structure or for storage, as appropriate.

If the assembly of the rim structure and the tire 24 is to be accomplished immediately following molding, the tire, due to its elevated temperature and still flexible condition, is worked over the flange 30 on the rim 18 and allowed to cool. Upon cooling, the tire 24 shrinks and simultaneously increases in rigidity. If the tire is to be stored or allowed to cool after molding, it must be heated to, for example, approximately 200° F., prior to accomplishing the above-described assembly.

Referring specifically now to FIG. 3, as the tire 24 shrinks toward its ambient dimensions, the apex 35 of the groove 36 engages the apex 37 of the flange 30 and the tire 24 is thereby restrained from further shrinkage at this point. Since, as was set forth above, the sum of the dimensions B and C is greater than the sum of the dimensions A and D, and the dimension A is less than the dimension B, a gap is left between the inner periphery of the tire 24 and the outer periphery of the felly 28 and, as the side portions of the tire 24 continue to contract further, the mass of the tire clamps against the surfaces 32 and 34 of the flange 30, in the directions indicated by the curved arrows, thereby tightly and securely fixing the tire to the rim 18.

The flange 30 and the groove 36 thereby provide not only means to properly align the tire 24 and the treads 38, but means for tightly and securely connecting the two structures due to the interaction caused by the shrinkage of the tire after cooling. The flange and groove also provide means to reduce the volume of the more expensive tire material required by replacing it with the less expensive, more rigid plastic of the hub assembly. As was indicated above, the material from which the tire 24 is composed, although flexible at temperatures on the order of 200° F., is relatively stiff at room temperature, and will not re-soften under the temperatures normally encountered under ambient conditions.

From the foregoing description, one skilled in the art can easily ascertain the essential characteristics of this invention, and without departing from the spirit and scope thereof, can make various changes and modifications of the invention to adapt it to various usages and conditions.

What is claimed is:
1. A wheel assembly comprising:
   a rim structure;
   an outwardly extending flange disposed around the periphery of said rim structure;
   an annular solid plastic tire fitted on said rim structure, said tire having a recess corresponding in configuration to said flange around the inner periphery thereof, the depth of said recess being less than the height of said flange;
   the maximum normal ambient diameter of said recess being substantially less than the maximum diameter of said flange.
2. An assembly in accordance with claim 1 wherein said flange is triangular in cross-sectional configuration.
3. An assembly in accordance with claim 2 wherein the radius at the apex of said flange is equal to approximately 2.9 inches and the radius at the apex of said groove is equal to approximately 2.6 inches.

References Cited
UNITED STATES PATENTS

| 452,001 | 5/1891 | Yagn | 152—323 |
|---|---|---|---|
| 2,525,196 | 10/1950 | Bacon | 152—323 |
| 2,766,802 | 10/1956 | Grobowski. | |
| 2,935,357 | 5/1960 | Sutowski. | |
| 3,199,364 | 8/1965 | Dew. | |

FOREIGN PATENTS 708,605  5/1954  Great Britain.

ARTHUR L. LA POINT, *Primary Examiner.*

C. B. LYON, *Assistant Examiner.*

U.S. Cl. X.R.

301—63